United States Patent [19]

Pastorino

[11] Patent Number: 4,600,727
[45] Date of Patent: Jul. 15, 1986

[54] COMPOSITION AND METHOD FOR MAKING FOAMED POLYESTER RESIN

[75] Inventor: Ronald L. Pastorino, San Anselmo, Calif.

[73] Assignee: U.S. Peroxygen Company, Richmond, Calif.

[21] Appl. No.: 623,811

[22] Filed: Jun. 22, 1984

[51] Int. Cl.⁴ ............................................. C08J 9/08
[52] U.S. Cl. ..................... 521/82; 521/92; 521/99; 521/125; 521/138; 521/182
[58] Field of Search .............. 521/92, 125, 138, 182, 521/99, 82

[56] References Cited

U.S. PATENT DOCUMENTS

| | | | |
|---|---|---|---|
| 3,479,303 | 11/1969 | Wiescbollek et al. | 260/2.5 |
| 4,016,112 | 4/1977 | Kajiura et al. | 260/2.5 |
| 4,028,289 | 6/1977 | Brown | 260/2.5 |
| 4,119,583 | 10/1978 | Filip et al. | 521/103 |
| 4,122,047 | 10/1978 | Filip et al. | 521/106 |
| 4,216,294 | 8/1980 | Halle et al. | 521/99 |
| 4,347,331 | 8/1982 | Self | 521/119 |

FOREIGN PATENT DOCUMENTS

| | | | |
|---|---|---|---|
| 652770 | 5/1951 | United Kingdom | 521/138 |
| 2029834 | 3/1980 | United Kingdom | |

Primary Examiner—Morton Foelak
Attorney, Agent, or Firm—Townsend and Townsend

[57] ABSTRACT

A composition for foaming polyester which includes a carbonate or bicarbonate salt and water intermixed with a finely divided solid free flow agent such a synthetic amorphous silica. The free flow agent is added in an amount sufficient to absorb all of the water and render the composition a free flowing powder. The composition is readily mixable with an unsaturated polyester resin media. A source of acid in the mixture liberates gas from the carbonate or bicarbonate, and good foam structures having small uniform cells are obtained.

11 Claims, 1 Drawing Figure

FIGURE I.
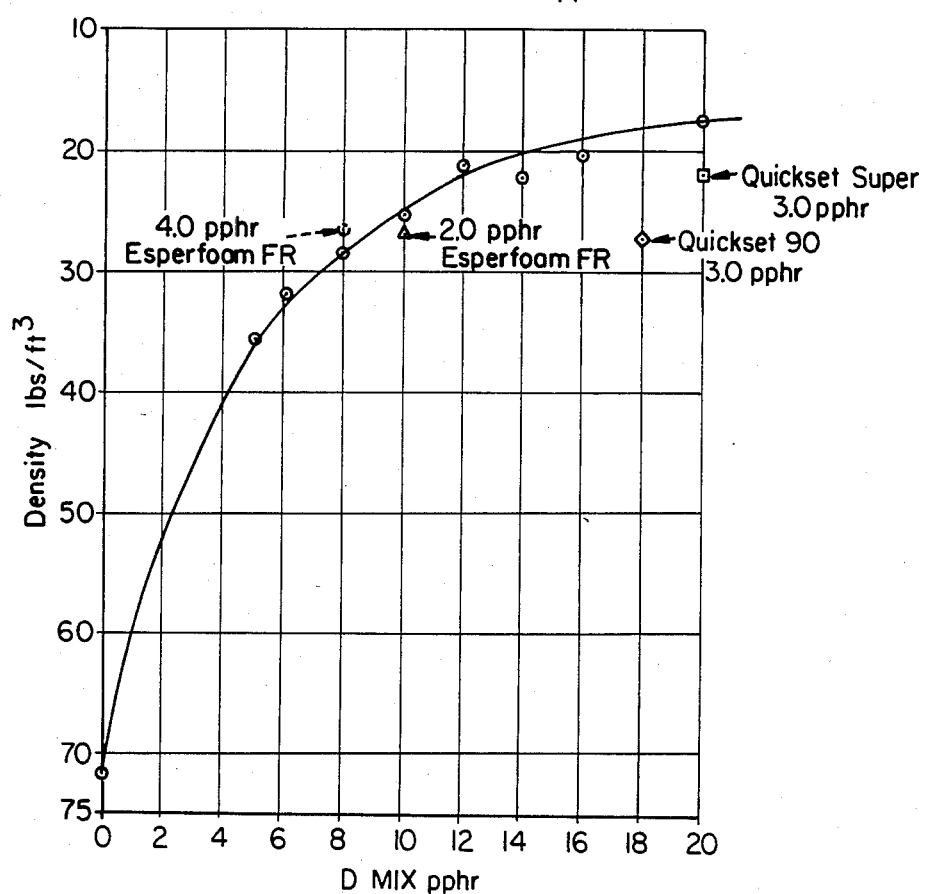

COMPOSITION AND METHOD FOR MAKING FOAMED POLYESTER RESIN

BACKGROUND OF THE INVENTION

This invention relates to the making of foams from unsaturated polyester resins. More particularly, it relates to compositions useful in methods for creating a foam structure in polyester resin products by providing a source of gas for expansion of the resin.

There is a well developed body of prior art designed to foam unsaturated polyester resins with gaseous blowing agents. Over the years unsaturated polyesters have been foamed by generating $CO_2$ gas through the acid decomposition of carbonate and bicarbonate salts. Typically the carbonate salt per se is mixed directly into the unsaturated resin mass and acid added. Typical references employing such techniques include U.S. Pat. Nos. 3,479,303, 4,016,112, 4,028,289, 4,119,583, 4,122,047, 4,347,331 and British Pat. No. 2,029,834.

To date there has been only limited commercial success utilizing carbonate salts for generating $CO_2$. One of the drawbacks which apparently limits wide spread industry acceptance of the process includes the requirement for a significant amount of acid such as acetic acid and water to be added to the resin to help solubilize the carbonate granules and to start their decomposition for gas formation. In general, there has been a lack of consistent results in terms of the desired uniform foam structures. This lack of uniformity is most likely due to difficulties in dispersing a relatively coarse inorganic salt in the organic medium presented by the unsaturated polyester resin.

SUMMARY OF THE INVENTION

Foams from unsaturated polyester resin having a uniform and fine cell structure are now consistently possible utilizing carbonate and bicarbonate salts. This goal is accomplished by utilizing a composition including a salt selected from sodium and potassium carbonates and bicarbonates, or mixtures thereof, and water intermixed with a sufficient amount of finely divided solid free flow agent to absorb the water and render the composition a free flowing powder. In the preferred embodiment the salt is initially dissolved in the water before intermixture with the free flow agent. The free flowing powder containing the inorganic salt is readily mixable with, and uniformly dispersable in, the organic resin media. The salt is present in the powder as relatively uniform fine particles. While the composition is a free flowing powder, water is present on the free flow agent to provide an efficient reaction media between acid and the carbonate or bicarbonate salt in the formation of $CO_2$ gas. The free flow agent can also act as a nucleating agent in the foaming process.

DESCRIPTION OF THE PREFERRED EMBODIMENT

The present composition is used in a process in which liquid unsaturated polyesters are converted to a foam structure. Polyester resins useful in this invention are disclosed in detail in U.S. Pat. No. 4,216,294, incorporated herein by reference. Typically, the unsaturated polyester resin is preliminarily combined with an accelerator or promoter, also as described in U.S. Pat. No. 4,216,294. Promoted unsaturated polyester resins are generally contemplated for use in the present invention.

The unsaturated polyester is cured and crosslinked with an organic peroxide initiator, preferably a ketone peroxide such as methyl ethyl ketone peroxide. The organic peroxide will generally be present in an amount of about 0.5-5 weight percent of resin, more typically about 1-2 weight percent. The peroxide composition may contain diluents so that the peroxide content of the composition used may only be about 50% by weight. Amounts given here are based on peroxide content of such compositions.

The present invention is consistent with the prior art in that various additives may be included in the resin formulation to be foamed. For example, silicone surfactants have been utilized to insure entrapment and uniform dispersion of the gas liberated by the blowing agent. Again, typical silicone surfactants are disclosed in U.S. Pat. No. 4,216,294, incorporated herein by reference, and may be used in the present process.

The novel composition used in the present invention includes one of the highly water soluble sodium and potassium carbonates and bicarbonates, or mixtures thereof. The selected salt is preferably initially dissolved in water. In the preferred embodiment a saturated solution is sought. Higher concentrations of saturated solutions are obtained by utilizing an elevated temperature for the water. Beneficially, the salt is added to water at about 50°-90° C., and for convenience, at a temperature of about 60°-70° C.

The saturated liquid is then intermixed with a finely divided solid free flow agent present in an amount to absorb all of the water and thereby precipitate the dissolved salt. In doing so, the salt is dispersed on the free flow agent in a finely divided uniform state. In this form the salt and the water are most easily dispersed in the organic polyester media.

In using the present compositions, sufficient composition is added to provide about 1-10 weight percent of salt with respect to the polyester resin. The amount of salt in the composition will depend in part upon the concentration of salt in the water combined with the free flow agent. Where a preferred preformed saturated aqueous salt solution is used, the amount of salt in the composition will depend upon the temperature of the water being saturated with the salt. As will be seen, typical formulations will include compositions in which the salt comprises about 26% by weight of the composition which also contains water and free flow agent, and in which the salt was dissolved to saturate water at about 60° C. In the preferred embodiment the composition is added to provide about 3-6 weight percent of salt with respect to the polyester resin. While higher concentrations can be used, there does not appear to be any substantial benefit in density reduction, whereas lower salt concentrations may not provide the same degree of density reduction in the foamed resin product.

The free flow agent is selected from natural and synthetic silica and silicates and is generally a hydrophilic finely divided solid material capable of absorbing water and carrying precipitated carbonate and bicarbonate salts thereon. Typical materials are synthetic amorphous silica available under the trademark SIPERNAT 22 and utilized in the working examples herein. Other materials which are suitable as a free flow agent are diatomaceous earth and fumed silicas such as the commercial product known as AEROSIL 972. Typical silicate materials are synthetic alkaline earth metal silicates such as hydrous magnesium and calcium silicates. A typical commercial material in this latter category is the calcium silicate offered by Johns-Manville under the name MICRO-CEL.

While the invention is preferably practiced by dissolving the carbonate salt in heated water and precipitating the salt out of the solution onto the free flow agent while taking up the water on the free flow agent, improvements in the foamed products can be obtained by simply mixing the water, salt and free flow agent concurrently or sequentially adding salt and water to the free flow agent, instead of initially dissolving the salt in water and then combining the free flow agent.

During the making of the foamed product a gas is liberated from the carbonate or bicarbonate salt by reaction with a source of acid. Separate acids may be added to the reaction mixture for this purpose. Both inorganic and organic acids may be added for this purpose and in amounts which may facilitate the rate and extent of the foaming process beyond that obtained from any acid component already present in the particular polyester resin being used. The amounts utilized will generally be similar to the amounts of acid utilized in prior art processes employing $CO_2$ producing blowing agents. In the present process it is generally found that the polyester resin used in the process already contains sufficient acidic component to react with the carbonate or bicarbonate salt. Therefore, no additional acid will generally be required in the present process.

The following will more specifically illustrate the invention.

EXPERIMENTAL 60 grams of $KHCO_3$ was dissolved in 100 grams of water heated to 58°–60° C. With slow mixing, the solution was added to 70 grams SIPERNAT 22. The resulting powder was free flowing. This product is designated "D mix".

To 50 grams of CARGILL PE 8245 promoted unsaturated polyester resin was added 0.50 grams of Union Carbide's L5340 silicone surfactant, 10 grams "D mix," and 1.5 grams of Esperfoam FR ketone peroxide solution. This was hand mixed for approximately 45 seconds in an 8 ounce polyester jar.

Within 3 minutes there was about a two-fold increase in resin volume. At about 14 minutes the rise reached a maximum. Curing was evident at approximately 23 minutes and at 31 minutes the foamed resin was removed from the jar. The foam was uniform with a relatively fine cell structure.

The resultant density was 0.278 grams/cc or 17.4 lbs/ft$^3$.

Utilizing the above general procedure the data shown below in Table I was obtained. Trial #2 represents a control run where no blowing agent was used and no density reduction afforded. Other trials as indicated did not predissolve the salt in water. These are designated "hand mix".

TABLE I

Room Temperature 68–73° F.

| resin PE 8245 | 1 | 2 | 3 | 4 | 5 | 6 | 7 | 8 | 9 | 10 |
|---|---|---|---|---|---|---|---|---|---|---|
| wt resin | 50 | 50 | 50 | 50 | 50 | 50 | 50 | 50 | 50 | 50 |
| L5340 | | 0.25 | 0.25 | 0.28 | 0.25 | 0.25 | 0.50 | 0.50 | 0.50 | 0.10 |
| "A mix"[1] g | 26.8 | | | | | | | | | |
| "D mix"[2] g | | | 2.6 | 3.1 | 5.0 | 8.0 | 10.0 | 10.0 | 6.0 | 10.0 |
| "F mix"[3] g | | | | | | | | | | |
| NaHCO$_3$ g | | | | | | | | | | |
| KHCO$_3$ g | | | | | | | | | | |
| H$_2$O g | | | | | | | | | | |
| Sipernat 22 g | | | | | | | | | | |
| Esperfoam FR g | 1.5 | 1.5 | 1.5 | 1.5 | 1.5 | 1.5 | 1.5 | | 1.5 | 1.5 |
| Quickset 90 g | | | | | | | | | | |
| Quickset Super g | | | | | | | | 1.5 | | |
| Demold time (~ min.) | 60' | 120' | 67' | 38' | 26' | 29' | 31' | 29' | 20' | 36' |
| Density | | | | | | | | | | |
| g/cc | 0.58 | 1.15 | 0.57 | 0.51 | 0.41 | 0.33 | 0.28 | 0.35 | 0.34 | 0.32 |
| lbs/ft$^3$ | 36.2 | 71.8 | 35.6 | 32.1 | 25.2 | 20.3 | 17.4 | 22.0 | 21.3 | 20.2 |
| Rating of Cell Structure: Extent of Small Uniform Cells | fair | no foam | fair to good | good | good | good | good | good | good | good |

| resin PE 8245 | 11 | 12 | 13 | 14 | 15 | 16 | 17 | 18 | 19 | 20 |
|---|---|---|---|---|---|---|---|---|---|---|
| wt resin | 50 | 50 | 50 | 50 | 50 | 50 | 50 | 50 | 50 | 50 |
| L5340 | 0 | 0.25 | 0.25 | 0.25 | 0.25 | 0.25 | 0.25 | 0.30 | 0.30 | 0.30 |
| "A mix"[1] g | | | | | | | | | | |
| "D mix"[2] g | 10.0 | 4 | 4.1 | 0 | 5.0 | | | 9.0 | | |
| "F mix"[3] g | | | | | | | | | 8.0 | 3.0 |
| NaHCO$_3$ g | | | | | | 1.8 | | | | |
| KHCO$_3$ g | | | | 2.7 | | | 1.8[4] | | | |
| H$_2$O g | | | | | | 3.0 | 3.0 | | | |
| Sipernat 22 g | | | | | | | 2.2 | | | |
| Esperfoam FR g | 1.5 | 1.5 | 2.0 | 1.5 | 1.0 | 1.5 | 1.5 | | 1.5 | 1.5 |
| Quickset 90 g | | | | | | | | 1.5 | | |
| Quickset Super g | | | | | | | | | | |
| Demold time (~min) | 23' | 36' | 24' | 44' | 29' | 54' | 32' | 24' | 30' | 25' |
| Density/ | | | | | | | | | | |
| g/cc | 0.46 | 0.45 | 0.43 | 0.94 | 0.43 | 0.43 | 0.54 | 0.43 | 0.30 | 0.47 |

TABLE I-continued

| | Room Temperature 68–73° F. | | | | | | | | | |
|---|---|---|---|---|---|---|---|---|---|---|
| lbs/ft³ | 28.8 | 28.4 | 26.9 | 58.9 | 26.9 | 26.9 | 33.4 | 26.9 | 19.0 | 29.6 |
| Rating of Cell Structure: Extent of Small Uniform Cells | poor (split) | good | fair to good | poor | good | poor | fair to poor | good | good | good |

[1] A mix = hand mix of 86.7% $KHCO_3$, 6.9% Aerosil R972 + 6.4% L5340
[2] D mix = 26.0% $KHCO_3$, 43.1% $H_2O$, 30.9% Sipernat 22
[3] F mix = 24.8% $KHCO_3$, 4.9% $NaHCO_3$, 41.3% $H_2O$, 28.9% sipernat 22
[4] hand mixed "D mix" at room temperature FIG. 1 graphically represents some of the data obtained with particular reference to using various concentrations of "D mix". Also included in the graph are points obtained when using 2.0 and 4.0 pphr (parts per hundred based on the resin) of Esperfoam FR showing that peroxide concentration changes does not produce significantly different results. Use of different peroxide compositions (Quickset 90 and Quickset Super) resulted in somewhat higher densities. (These are all ketone peroxide formulations available from U.S. Peroxygen Company, Richmond, Calif.)

The following examples illustrate the use of different polyester resins.

Ex. I Resin:

US Steel MR-643 (Cultured Marble resin)

100 parts MR-643
1.1 parts L5340 silicon surfactant
20.0 parts "C mix"[1]
3.0 parts Esperfoam FR (MEKP)
Demold time: 27'
Density: 0.335 g/cc (20.9 lbs/ft³)
Appearance of foam cell structure: fair to good

Ex. II Resin:

US Steel MR-12184 ("Laminating resin, 50% maleic")

100 parts MR-12184
0.9 parts L5340
28 parts "C mix"[1]
3.0 Esperfoam FR
Demold time: 23'
Density: 0.445 g/cc (27.8 lbs/ft³)
Appearance of foam cell structure: fair to good

Ex. III Resin:

Ashland Chemical Aropol 8821

100 parts Aropol 8821 Casing Resin
0.71 parts L5340
17.6 parts "H mix"[2]
0.23 parts Esperfoam FR
2.7 parts benzoyl peroxide 40% suspension (BZQ-40)
Demold time: 60'
Density: 0.25 g/cc (15.5 lbs/ft³)
Appearance of foam cell structure: fair to good

Ex. IV Resin:

Ashland Chemical Aropol 8821

100 parts Aropol 8821
0.71 parts L5340
17.6 parts "H mix"[2]
0.53 parts Hi-Point 90 (MEK Peroxide)
Demold time: 55'
Density: 0.25 g/cc (15.5 lbs/ft³)
Appearance of foam cell structure: fair to good

Ex. V Resin:

Ashland Chemical Aropol 8821

100 parts Aropol 8821
0.71 parts L5340
17.6 parts "Room temp H mix"[3]
0.53 parts Hi-point 90
Demold time: 67'
Density: 0.268 g/cc (16.7 lbs/ft³)
Appearance of foam cell structure: poor to fair

Ex. VI Resin:

Freeman Chemical Stypol 40-4069 (G.P. spray-up resin)

| Trial: | 1 | 2 | 3 | 4 | 5 | 6 | 7 | 8 |
|---|---|---|---|---|---|---|---|---|
| resin (g): | 50 | 50 | 50 | 50 | 50 | 50 | 50 | 50 |
| L5340 (g) | — | — | — | — | — | — | — | — |
| "J mix" (g)[4] | 10 | 10 | 10 | 10 | 10 | — | 10 | 5.1 |
| $KHCO_3$ (g) | | | | | | 10 g | | |
| glacial Acetic acid (g) | | 0.25 | 0.50 | 0.75 | 1.25 | 0.50 | | 0.50 |
| proprionic acid (g) | | | | | | | 0.75 | |
| Esperfoam FR | 0.75 | 1.0 | 1.0 | | 1.0 | 1.0 | | 0.75 |
| Quickset Extra | | | | 1.0 | | | 1.0 | |
| Demold time (~ min) | 20' | 13' | 18' | 18' | 37' | 16' | 20' | 18' |
| Density: | | | | | | | | |
| g/cc: | 0.578 | 0.428 | 0.299 | 0.215 | 0.181 | 1.14 | 0.258 | 0.346 |
| lb/ft³: | 36.1 | 26.7 | 18.7 | 13.4 | 11.3 | 71.1 | 16.1 | 21.6 |
| Cell Structure | good | good | good | good | good | no foam | good | good |

[1] "C mix": 23% $KHCO_3$, 43% $H_2O$, 34% Sipernat 22. Prepared by dissolving $KHCO_3$ in $H_2O$ at approximately 65° C. and then added to Sipernat.
[2] "H mix": 23.1% $KHCO_3$, 11.5% $K_2CO_3$, 38.5% $H_2O$, 26.9% Sipernat 22. Prepared by dissolving the $KHCO_3$ + $K_2CO_3$ in $H_2O$ at approximately 65° C. and adding to the Sipernat 22.
[3] "Room temp. H mix": A physical mixture of the "H mix" components made by adding each to the Sipernat 22 and mixing at room temp.
[4] "J mix": Prepared by dissolving $KHCO_3$ in $H_2O$ at approximately 60° C. and added to mixture of Kenite, L5340 and Sipernat 22.

| $KHCO_3$ | 25.1% |
|---|---|
| $H_2O$ | 42.0% |
| Kenite (diatomaceous earth) | 6.3% |
| L5340 | 3.5% |
| Sipernat 22 | 23.0% |

What is claimed is:
1. In the method for making a foamed polyester resin by curing and crosslinking unsaturated polyester resin and expanding the resin into a cellular structure with a gas, the improvement wherein said gas is generated by incorporating in the resin an effective amount of a resin foaming composition in the presence of an acid for gas liberating reaction with said composition, said composition comprising; a salt selected from sodium and potassium carbonates and bicarbonates; water; and intermixed therewith sufficient finely divided solid free flow agent to absorb said water and make the composition a free flowing powder.

2. The improved method in accordance with claim 1, wherein the salt in said composition is initially dissolved in said water before intermixture with said free flow agent.

3. The improved method in accordance with claim 2, wherein said salt is present in an amount of about 1–10 weight percent of said resin.

4. The improved method in accordance with claim 2, wherein said salt is present in an amount of about 3–6 weight percent of said resin.

5. The improved method in accordance with claim 2, wherein said curing and crosslinking is executed with an organic peroxide.

6. The improved method in accordance with claim 5, wherein said organic peroxide is a ketone peroxide.

7. The improved method in accordance with claim 5, wherein said organic peroxide is present in an amount of about 0.5–5 weight percent of said resin.

8. The improved method in accordance with claim 7, wherein said organic peroxide is present in an amount of about 1–2 weight percent of said resin.

9. The improved method in accordance with claim 2, wherein said gas liberating acid is initially present in the unsaturated polyester resin used in the method.

10. The improved method in accordance with claim 2, wherein gas liberating acid is separately added to said polyester resin in addition to any acid already present in the resin.

11. The improved method in accordance with claim 2, wherein the salt in said composition is dissolved in said water in an amount sufficient to saturate the solution.

* * * * *